US012683465B2

(12) United States Patent
Horio et al.

(10) Patent No.: US 12,683,465 B2
(45) Date of Patent: Jul. 14, 2026

(54) ROTARY ELECTRIC MACHINE

(71) Applicant: AISIN CORPORATION, Kariya (JP)

(72) Inventors: Akihiro Horio, Kariya (JP); Nozomu Takahashi, Kariya (JP); Takayoshi Hanai, Kariya (JP)

(73) Assignee: AISIN CORPORATION, Kariya (JP)

( * ) Notice: Subject to any disclaimer, the term of this patent is extended or adjusted under 35 U.S.C. 154(b) by 402 days.

(21) Appl. No.: 18/031,481

(22) PCT Filed: Nov. 10, 2021

(86) PCT No.: PCT/JP2021/041434
§ 371 (c)(1),
(2) Date: Apr. 12, 2023

(87) PCT Pub. No.: WO2022/113746
PCT Pub. Date: Jun. 2, 2022

(65) Prior Publication Data
US 2023/0327518 A1 Oct. 12, 2023

(30) Foreign Application Priority Data

Nov. 25, 2020 (JP) ................................ 2020-195272
Dec. 2, 2020 (JP) ................................ 2020-200296

(51) Int. Cl.
*H02K 9/19* (2006.01)
*F16H 57/04* (2010.01)
(52) U.S. Cl.
CPC .......... *H02K 9/19* (2013.01); *F16H 57/0412* (2013.01)

(58) Field of Classification Search
CPC ....... F16H 57/0412; H02K 5/203; H02K 9/19
See application file for complete search history.

(56) References Cited

U.S. PATENT DOCUMENTS 9,379,595 B2 6/2016 Kawai et al.
2010/0270094 A1 10/2010 Nakayama et al.
(Continued)

FOREIGN PATENT DOCUMENTS

JP 2009-017700 A 1/2009
JP 2010-259207 A 11/2010
(Continued)

OTHER PUBLICATIONS

Jan. 10, 2024 Extended Search Report issued in European Patent Application No. 21897720.5.
(Continued)

*Primary Examiner* — Christopher M Koehler
*Assistant Examiner* — Ethan Nguyen Vo
(74) *Attorney, Agent, or Firm* — Oliff PLC

(57) ABSTRACT

A rotary electric machine that includes a stator including a stator core and a coil, and including a radial protrusion for fastening, and a case that supports the stator core. The case includes a fastening portion to which the radial protrusion is fastened, paired stator holding portions located on respective sides of the fastening portion when viewed in an axial direction, and forming respective curved holding surfaces extending in the axial direction and abutting against or facing an outer peripheral surface of the stator core in a radial direction, and axial stator cooling oil passages formed in the respective paired stator holding portions.

5 Claims, 12 Drawing Sheets

(56) References Cited

U.S. PATENT DOCUMENTS

| 2017/0279329 | A1  |        | 9/2017 | Hanumalagutti et al. |             |
|--------------|-----|--------|--------|----------------------|-------------|
| 2020/0266687 | A1  |        | 8/2020 | Nakamatsu            |             |
| 2021/0249932 | A1  | *      | 8/2021 | Sakai                | H02K 9/19   |
| 2022/0123628 | A1  | *      | 4/2022 | Nakamatsu            | H02K 5/20   |
| 2022/0149701 | A1  |        | 5/2022 | Nakamatsu et al.     |             |
| 2022/0173638 | A1  |        | 6/2022 | Nakamatsu et al.     |             |
| 2022/0173639 | A1  |        | 6/2022 | Nakamatsu et al.     |             |
| 2022/0216771 | A1  | *      | 7/2022 | Kawashima            | F16H 57/0441 |
| 2023/0307981 | A1  | *      | 9/2023 | Nomiyama             | H02K 9/19   |

FOREIGN PATENT DOCUMENTS

| JP | 2011-217437     | A   |   | 10/2011 |            |
|----|-----------------|-----|---|---------|------------|
| JP | 2019-140788     | A   |   | 8/2019  |            |
| JP | 2020-137405     | A   |   | 8/2020  |            |
| JP | 2020-141544     | A   |   | 9/2020  |            |
| WO | WO-2020179216   | A1  | * | 9/2020  | B60L 50/51 |

OTHER PUBLICATIONS

Dec. 21, 2021 International Search Report issued in International Patent Application No. PCT/JP2021/041434.

* cited by examiner

A–A

ROTARY ELECTRIC MACHINE

TECHNICAL FIELD

The present disclosure relates to a rotary electric machine.

BACKGROUND ART

There is known a technology in which a stator having radial protrusions (also referred to as "bolt fixing portions") for fastening to a case is provided, pipes extend at positions near the radial protrusions when viewed in an axial direction, and coil ends are cooled by using oil passages in the pipes.

RELATED ART DOCUMENTS

Patent Documents

Patent Document 1: Japanese Unexamined Patent Application Publication No. 2009-17700 (JP 2009-17700 A)

SUMMARY OF THE DISCLOSURE

Problem to be Solved by the Invention

In the related art described above, the pipes are disposed at the positions beside the radial protrusions for fastening in a circumferential direction. Therefore, the radial size of the stator due to the pipes (and accordingly the radial size of the entire rotary electric machine including the case) can be reduced. However, there is a problem of an increase in cost due to the use of the plurality of pipes.

In one aspect, the present disclosure has an object to establish oil passages for a rotary electric machine in such a manner that the radial size and cost of the entire rotary electric machine including a case can be reduced.

Means for Solving the Problem

One aspect of the present disclosure provides a rotary electric machine that includes a stator including a stator core and a coil, and including a radial protrusion for fastening; and a case that supports the stator core.
The case includes:
a fastening portion to which the radial protrusion is fastened;
paired stator holding portions located on respective sides of the fastening portion when viewed in an axial direction, and forming respective curved holding surfaces extending in the axial direction and abutting against or facing an outer peripheral surface of the stator core in a radial direction; and
axial stator cooling oil passages formed in the respective paired stator holding portions.

Effects of the Invention

According to the present disclosure, it is possible to establish the oil passages for the rotary electric machine in such a manner that the radial size and cost of the entire rotary electric machine including the case can be reduced.

MODES FOR CARRYING OUT THE DISCLOSURE

Figure 1:
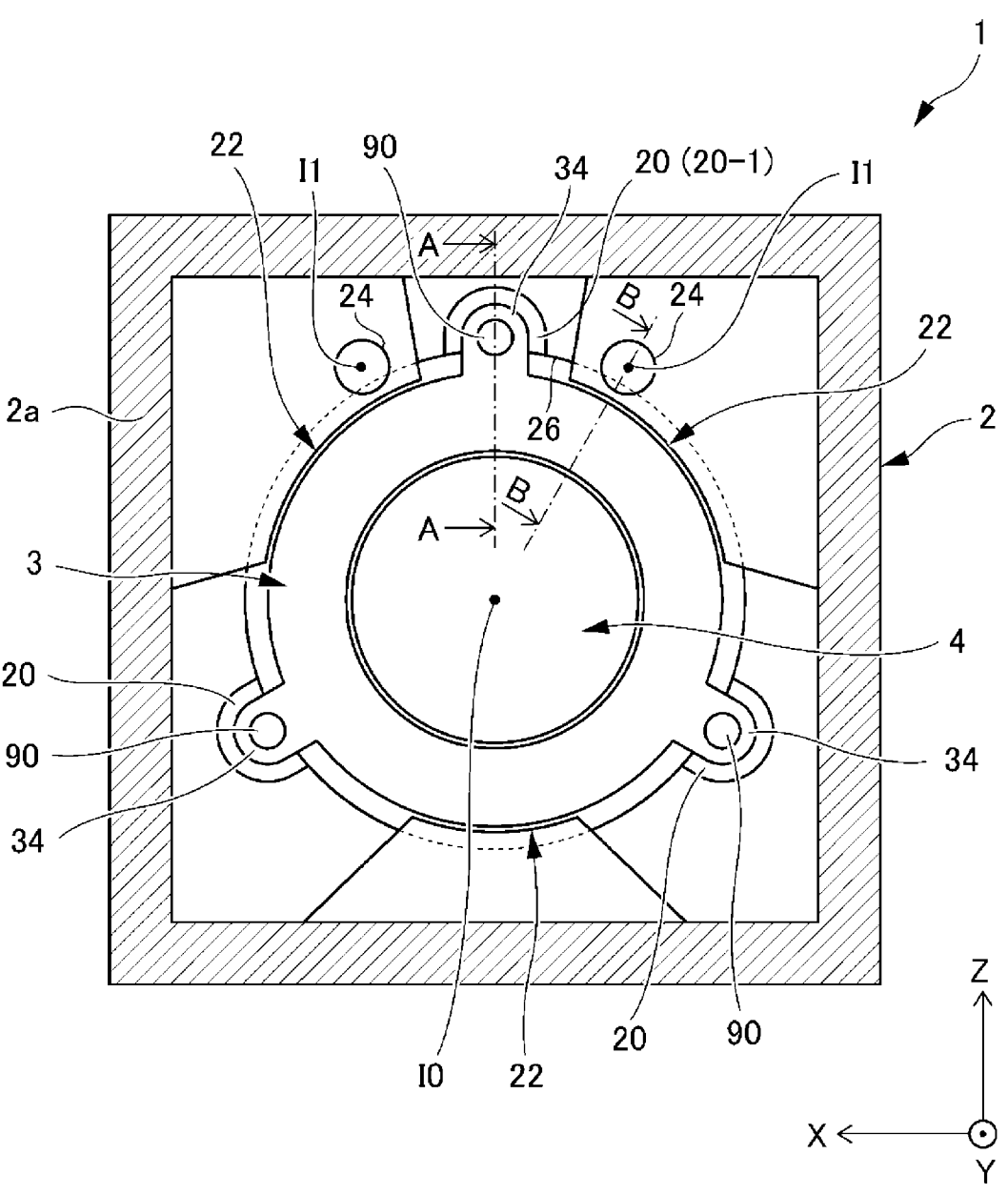
FIG. 1 is a plan view schematically showing a rotary electric machine according to a first embodiment.

Embodiments will be described in detail below with reference to the accompanying drawings. The dimensional ratios in the drawings are merely illustrative, and are not limited to these. The shapes etc. in the drawings may be partially exaggerated for convenience of description. To make the drawings easy to see, reference signs may be given only to part of a plurality of sections having the same attributes.

Figure 2:
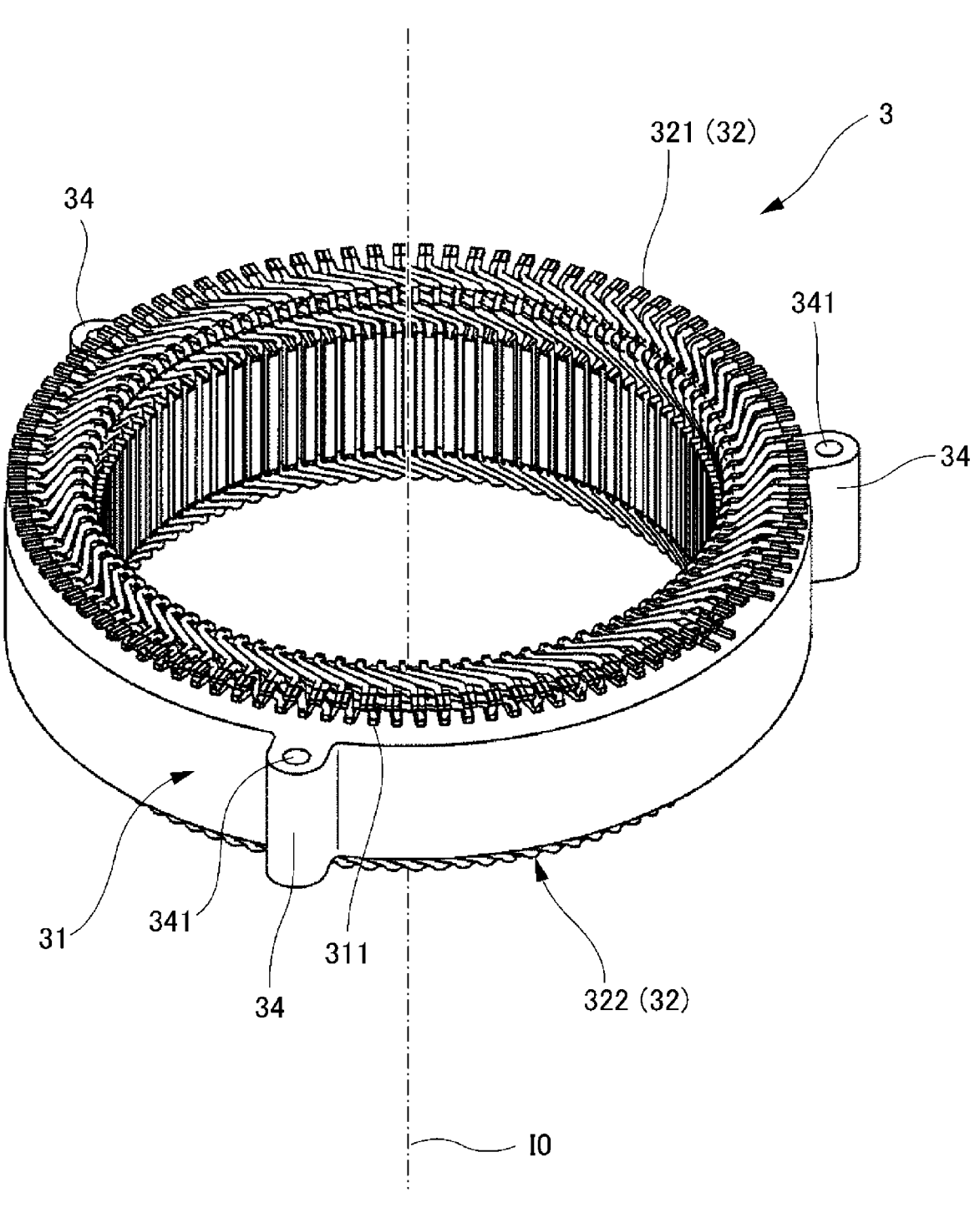
FIG. 2 is a perspective view showing an example of a stator.
Figure 3:
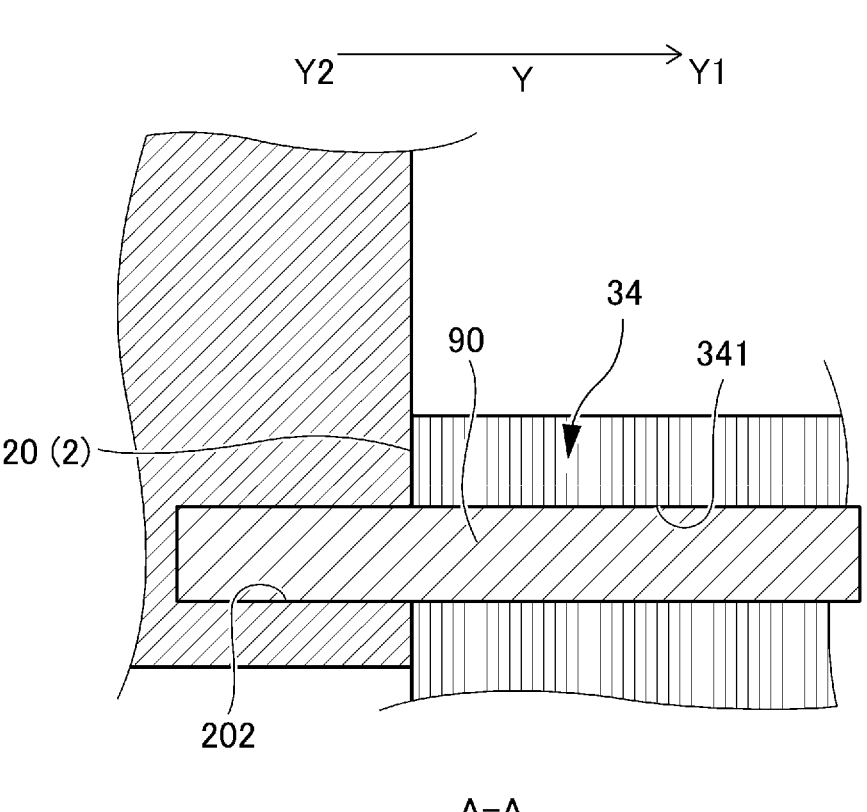
FIG. 3 is a schematic sectional view taken along a line A-A of FIG. 1.
Figure 4:
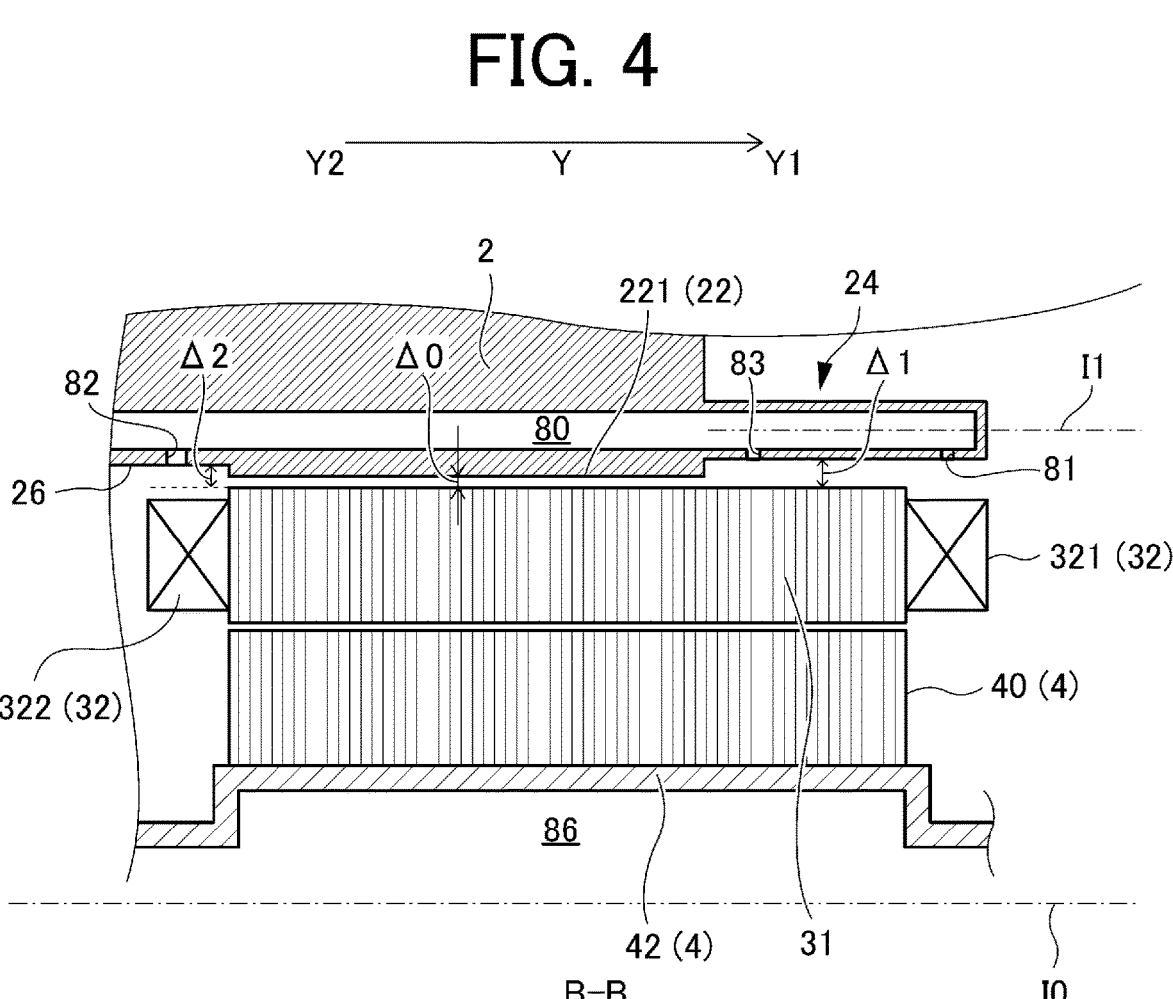
FIG. 4 is a schematic sectional view taken along a line B-B of FIG. 1.
Figure 5:
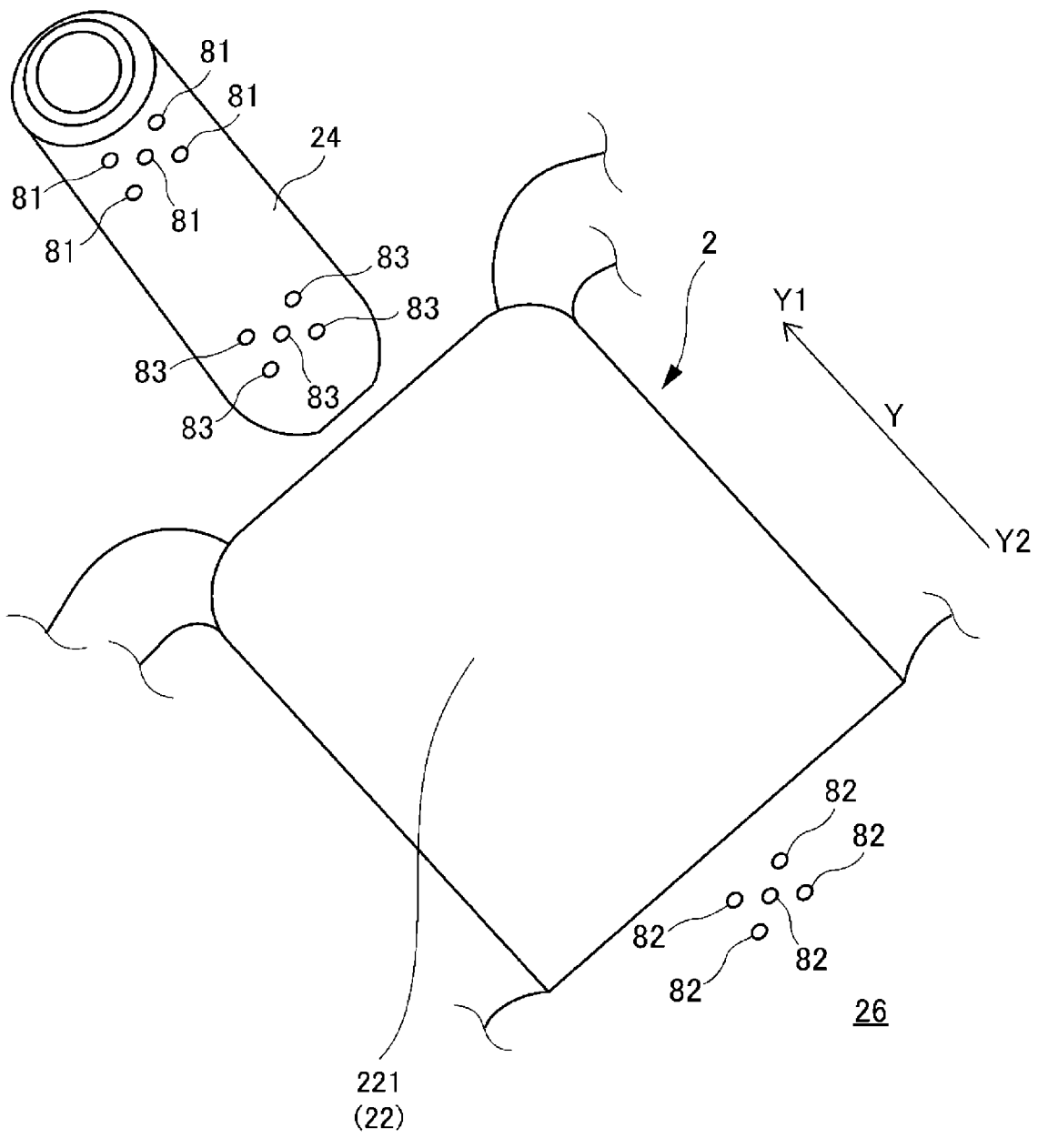
FIG. 5 is a perspective view schematically showing a stator holding portion, a tubular portion, and a side wall portion.

FIG. 1 is a plan view schematically showing a rotary electric machine 1 according to an embodiment. In FIG. 1, X, Y, and Z axes are defined in a right-handed coordinate system, and a Y direction is parallel to an extending direction of a central axis I0 (design central axis I0) of the rotary electric machine 1. A Z direction corresponds to a vertical direction, and a positive side in the Z direction corresponds to an upper side. The Z direction need not be parallel to the direction of gravity. FIG. 1 is a plan view in the Y direction, and only a peripheral wall portion 2a of a case 2 is shown in cross section (planar cross section along an XZ plane). An axial direction, a radial direction, and a circumferential direction hereinafter represent directions based on a rotating body around the central axis I0. FIG. 2 is a perspective view showing an example of a stator 3. FIG. 3 is a schematic sectional view taken along a line A-A of FIG. 1. FIG. 4 is a schematic sectional view taken along a line B-B of FIG. 1. In FIGS. 3 and 4, a Y1 side (positive side in the Y direction) and a Y2 side (negative side in the Y direction) along the Y direction are defined. FIG. 5 is a perspective view schematically showing a stator holding portion 22, a tubular portion 24, and a side wall portion 26.

The rotary electric machine 1 includes the case 2, the stator 3, a rotor 4, and an oil passage structure 8.

The case 2 forms a chamber that houses the stator 3. The case 2 supports the stator 3. The case 2 may be formed, for example, by casting aluminum. The case 2 may be realized by two or more case members. The case 2 may form a part of a chamber that houses elements other than the rotary electric machine 1 (for example, an inverter or a power transmission mechanism (not shown)).

The case 2 includes a fastening portion 20, the stator holding portion 22, the tubular portion 24, and the side wall portion 26.

The fastening portion 20 is a portion for fastening the stator 3 to the case 2. A plurality of fastening portions 20 may be provided around the central axis I0 when viewed in the axial direction. In the present embodiment, the fastening portions 20 are provided, for example, at three locations at intervals of 120° in conjunction with radial protrusions 34 of the stator 3 described later. Each fastening portion 20 forms a seating portion (seating portion for the radial protrusion 34) parallel to the XZ plane, and has a fastening hole 202 (see FIG. 3). A fastener 90 such as a bolt may be screwed into each fastening hole 202. The upper fastening portion 20 out of the three fastening portions 20 is hereinafter also referred to as "fastening portion 20-1". In the example shown in FIG. 1, the fastening portion 20-1 is set at the uppermost position (top position) around the central axis I0, but may be set at a position that slightly deviates from the top position (for example, a position within) 45°.

The stator holding portion 22 has a function of keeping the posture of the stator 3 (for example, a function of preventing inclination of the stator 3, which is also referred to as "stator holding function"). The stator holding portion 22 forms a curved holding surface 221 to realize such a stator holding function. The curved holding surface 221 extends in the axial direction and faces the outer peripheral surface of a stator core 31 in the radial direction. A radial gap (clearance) 40 (see FIG. 4) between the curved holding surface 221 and the outer peripheral surface of the stator core 31 may be a very small value such as approximately zero, and may correspond to, for example, the maximum value in a possible deviation range (variable range due to tolerance etc.) with respect to a design value (nominal value) of the outside diameter of the stator core 31. In this case, the curved holding surface 221 may abut against the outer peripheral surface of the stator core 31 in the radial direction depending on the individual stator core 31. Alternatively, the radial gap Δ0 (see FIG. 4) between the curved holding surface 221 and the outer peripheral surface of the stator core 31 may slightly be larger than the maximum value in the possible deviation range with respect to the design value of the outside diameter of the stator core 31. In either case, the outer peripheral surface of the stator core 31 comes into contact with the curved holding surface 221 when the posture of the stator 3 changes in such a manner that the axis of the stator 3 is inclined with respect to the normal central axis I0. In this manner, the stator holding function suppresses the change in the posture of the stator 3. In the following description, the gap Δ0 is assumed to be approximately zero.

The curved holding surface 221 is preferably a part of the outer peripheral surface of a cylindrical body around the central axis I0. That is, the curved holding surface 221 is preferably formed by offsetting the outer peripheral surface of the stator core 31 in a normal shape radially outward. In this case, the radial gap Δ0 (see FIG. 4) between the curved holding surface 221 and the outer peripheral surface of the stator core 31 is constant over the entire circumference of the curved holding surface 221 when the outside diameter of the stator core 31 is the design value (nominal value).

A plurality of stator holding portions 22 may be provided. In the present embodiment, the stator holding portions 22 are provided on both sides of the fastening portion 20-1 in the circumferential direction so as to sandwich the fastening portion 20-1 in the circumferential direction. The two stator holding portions 22 provided on both sides of the fastening portion 20-1 in the circumferential direction are hereinafter also referred to as "paired stator holding portions 22". The stator holding portion 22 may be provided at a location other than both sides of the fastening portion 20-1 in the circumferential direction. In the example shown in FIG. 1, a total of three stator holding portions 22 are provided in pairs on both sides of each fastening portion 20.

The set range of the stator holding portion 22 (curved holding surface 221) in the circumferential direction (circumferential range of the radially facing stator holding portion 22 on the entire circumference of the stator core 31) is adapted so as to properly realize the stator holding function of the stator holding portion 22. The material cost tends to increase as the set range of the stator holding portion 22 in the circumferential direction is wider. Therefore, the set range of the stator holding portion 22 in the circumferential direction may be kept minimally. In the present embodiment, the stator holding portions 22 are disposed in pairs on both sides of the fastening portion 20 and distributed in the circumferential direction. Therefore, efficient disposition can be realized.

Similarly, the set range of the stator holding portion 22 (curved holding surface 221) in the axial direction (axial range of the radially facing stator holding portion 22 on the total axial length of the stator core 31) is adapted so as to properly realize the stator holding function of the stator holding portion 22. The material cost tends to increase as the set range of the stator holding portion 22 in the axial direction is wider. Therefore, the set range of the stator holding portion 22 in the axial direction may be kept minimally. In the present embodiment, as shown in FIG. 4, the set range of the stator holding portion 22 (curved holding surface 221) in the axial direction is, for example, a range significantly smaller than the total axial length of the stator core 31. Specifically, as shown in FIG. 4, each of the paired stator holding portions 22 is provided so as not to reach a coil end 321 on the Y1 side.

A part of an oil passage 80 described later is formed in each of the paired stator holding portions 22. The configuration of the oil passage 80 will be detailed later.

The tubular portion 24 is provided to adjoin each of the paired stator holding portions 22 in the axial direction. The two tubular portions 24 provided in association with the paired stator holding portions 22 are hereinafter also referred to as "paired tubular portions 24".

Each of the paired tubular portions 24 extends in the axial direction. Specifically, each of the paired tubular portions 24 has one end (end on the Y2 side) connected to the corresponding stator holding portion 22 and the other end (end on the Y1 side) as a free end. Each of the paired tubular portions 24 has a hollow pipe shape, and the inside forms a part of the oil passage 80.

The sectional shape of each tubular portion 24 (sectional shape taken along the XZ plane) is, for example, a circular shape, but may be another shape (for example, a rectangular shape). The sectional shape of each tubular portion 24 may be uniform substantially over the entire axial length.

The paired tubular portions 24 may be disposed concentrically around the central axis I0. That is, central axes I1 of the paired tubular portions 24 may be at the same distance (same diameter) from the central axis I0. The central axis I1 of each of the paired tubular portions 24 may be parallel to the central axis I0.

The paired tubular portions 24 are preferably provided at radial positions that are unlikely to cause an increase in the radial size of the entire rotary electric machine 1 including the case 2. For example, the radially innermost portions of the paired tubular portions 24 (and the radially innermost portions of their hollow interiors) are closer to the central axis I0 in the radial direction than the radially outermost portions of the radial protrusions 34. In this case, the radially outermost portions of the paired tubular portions 24 are not spaced excessively away from the central axis I0 in the radial direction. Therefore, it is possible to reduce the possibility that the radial size of the entire rotary electric machine 1 increases due to the paired tubular portions 24.

In the present embodiment, as shown in FIG. 4, the paired tubular portions 24 are provided close to the outer peripheral surface of the stator core 31 so as to be spaced away from the outer peripheral surface of the stator core 31 by a relatively small gap Δ1. In the example shown in FIG. 4, the radial gap Δ1 (see FIG. 4) between the paired tubular portions 24 and the outer peripheral surface of the stator core 31 may slightly be larger than Δ0 described above. That is, the paired tubular portions 24 are spaced slightly away from the central axis I0 compared to the paired stator holding portions 22 (curved holding surfaces 221). Such a gap Δ1 may be a minimum value at which oil can be discharged from an oil hole 81 described later.

A part of the oil passage 80 is formed in each of the paired tubular portions 24 as described above and as shown in FIG. 4. That is, the oil passages 80 are also formed in the paired tubular portions 24 continuously from each of the paired stator holding portions 22 to each of the paired tubular portions 24. In this case, the oil passages 80 may linearly extend in the Y direction in uniform cross sections (cross sections taken along the XZ plane) in the paired stator holding portions 22 and the paired tubular portions 24. The end (free end) of each tubular portion 24 on the Y1 side may be closed by a separate plug member.

Each of the paired tubular portions 24 has the oil hole 81 communicating with the oil passage 80 as shown in FIGS. 4 and 5. The oil hole 81 is formed so as to discharge oil toward the coil end 321 on one axial side (Y1 side). A plurality of oil holes 81 may be provided as shown in, for example, FIG. 5. In this case, the oil holes 81 can discharge oil in various directions toward the coil end 321. Therefore, the entire circumference of the coil end 321 can be cooled more uniformly. For example, the oil hole 81 may be formed so as to discharge oil in a tangential direction to the outer peripheral portion of the coil end 321 when viewed in the axial direction. The coil end 321 may extend to a side opposite to a lead.

The paired tubular portions 24 may have a similar oil hole 83 radially facing the outer peripheral surface of the stator core 31 in addition to the oil hole 81 radially facing the coil end 321 on the Y1 side. A plurality of oil holes 83 may be provided. In this case, the oil holes 83 can discharge oil in various directions toward the stator core 31. Therefore, the entire circumference of the stator core 31 can be cooled more uniformly. For example, the oil hole 83 may be formed so as to discharge oil in a tangential direction to the outer peripheral surface of the stator core 31 when viewed in the axial direction.

In the present embodiment, each of the paired tubular portions 24 has the radial gap Δ1 from the outer peripheral surface of the stator core 31 as described above. Therefore, oil can be discharged to the outer peripheral surface of the stator core 31 from the oil hole 83 (oil hole 83 radially facing the stator core 31). Thus, coils 32 in slots 311 can be cooled via the stator core 31.

In a modification, the paired tubular portions 24 may have the similar oil hole 83 radially facing the outer peripheral surface of the stator core 31 instead of the oil hole 81 radially facing the coil end 321 on the Y1 side. In such a modification, the paired tubular portions 24 may be shorter. That is, the paired tubular portions 24 need not extend to the axial positions where they radially face the coil end 321.

The side wall portion 26 is provided to adjoin each of the paired stator holding portions 22 in the axial direction on a side opposite to the paired tubular portions 24. That is, the side wall portion 26 is provided continuously to the Y2 side from the ends of the paired stator holding portions 22 on the Y2 side. The side wall portion 26 may be provided separately for each of the paired stator holding portions 22 or provided integrally so as to be continuous in the circumferential direction. The side wall portion 26 may extend to the Y2 side with respect to the fastening portion 20.

The side wall portion 26 is farther away from the central axis I0 in the radial direction than the curved holding surface 221. For example, the side wall portion 26 extends at a radial position spaced away from the outer peripheral surface of the stator core 31 by a relatively small gap Δ2. The gap Δ2 may be the same as the gap Δ1. In the example shown in FIG. 4, the side wall portion 26 does not radially face the stator core 31 but radially faces a coil end 322 on the Y2 side. In a modification, the side wall portion 26 may radially face the end of the stator core 31 on the Y2 side and radially face the coil end 322 on the Y2 side.

A part of the oil passage 80 is formed in the side wall portion 26. That is, the oil passage 80 is also formed in the side wall portion 26 continuously from the side wall portion 26 to each of the paired stator holding portions 22. In this case, the oil passages 80 may linearly extend in the Y direction in uniform cross sections (cross sections taken along the XZ plane) in the side wall portion 26 and the paired stator holding portions 22. Each oil passage 80 may have an end of the range of linear extension in the axial direction on the Y2 side of the side wall portion 26.

The side wall portion 26 has an oil hole 82 communicating with the oil passage 80 as shown in FIGS. 4 and 5. The oil hole 82 is formed so as to discharge oil in the oil passage 80 toward the coil end 322 on the other axial side (Y2 side). A plurality of oil holes 82 may be provided as shown in, for example, FIG. 5. In this case, the oil holes 82 can discharge oil in various directions toward the coil end 322. Therefore, the entire circumference of the coil end 322 can be cooled more uniformly. For example, the oil hole 82 may be formed so as to discharge oil in a tangential direction to the outer peripheral portion of the coil end 322 when viewed in the axial direction. The coil end 322 may extend to the lead side.

In a modification, the side wall portion 26 may have a similar oil hole radially facing the outer peripheral surface of the stator core 31 in addition to or instead of the oil hole 82 radially facing the coil end 322 on the Y2 side.

The stator 3 is provided concentrically with the central axis I0. That is, the central axis (axial center) of the stator 3 coincides with the central axis I0. The stator 3 includes the stator core 31 and the coils 32.

The stator core 31 may be formed, for example, by stacking electromagnetic steel sheets. The coil 32 is, for example, a coil wire having a rectangular cross section and is wound around the slot 311 of the stator core 31. The coil 32 forms the coil ends 321 and 322 on both axial sides of the stator core 31.

In the present embodiment, the stator 3 includes the radial protrusions 34 for fastening. The radial protrusion 34 for fastening protrudes in the radial direction, and is also referred to as "bolt fixing portion". The radial protrusions 34 for fastening are provided to fix the stator 3 to the case 2 by fastening. The radial protrusions 34 may be formed integrally with the stator core 31 or may be formed separately and connected to the stator core 31. As shown in FIG. 2, the radial protrusions 34 for fastening may be provided over the entire axial length of the stator core 31. The radial protrusions 34 for fastening may be provided at regular intervals in the circumferential direction. In the example shown in FIG. 2, the radial protrusions 34 are provided at three locations at intervals of 120°.

Each radial protrusion 34 for fastening has a fastening hole 341. The fastening hole 341 is formed, for example, so as to pass through the radial protrusion 34 in the axial direction. The fastener 90 is inserted through each fastening hole 341. As shown in FIGS. 2 and 3, the stator 3 is fixed by fastening to the case 2 by screwing the fastener 90 to the fastening portion 20 of the case 2 through the fastening hole 341.

The rotor 4 is provided on a radially inner side of the stator 3. The rotor 4 includes a rotor core 40 and a rotor shaft 42 as schematically shown in FIG. 4.

The rotor core 40 may be formed, for example, by stacking electromagnetic steel sheets. Permanent magnets (not shown) may be embedded in the rotor core 40.

The rotor shaft 42 is preferably a hollow member as shown in FIG. 4. In this case, oil can be supplied to the hollow interior of the rotor shaft 42 (see an axial oil passage 86 described later), and the oil can cool the rotor core 40 and/or the permanent magnets from the radially inner side. The rotor shaft 42 may have an oil hole (not shown) that can discharge the oil in the hollow interior toward the coil ends 321 and 322 by using a centrifugal force.

The oil passage structure 8 includes the oil passages 80 formed in the case 2 as described above. In the present embodiment, the oil passage structure 8 includes, for example, the axial oil passage 86 formed by the hollow interior of the rotor shaft 42 described above.

Next, the oil passage structure 8 of the rotary electric machine 1 according to the present embodiment will be described with reference to FIG. 6.

Figure 6:
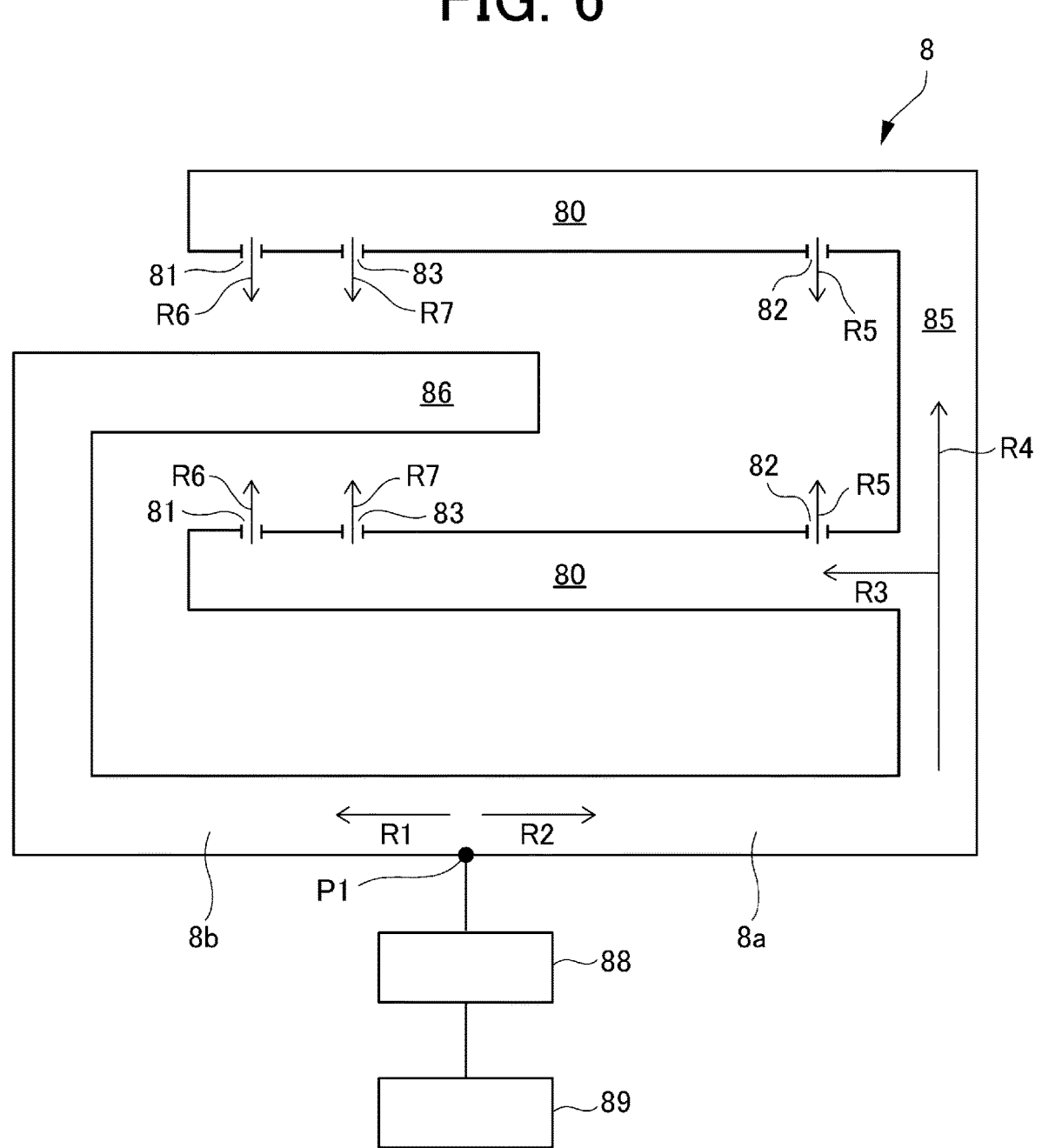
FIG. 6 is a diagram schematically showing an oil passage structure according to the first embodiment.

FIG. 6 is a diagram schematically showing the oil passage structure 8. FIG. 6 schematically shows oil flows by arrows R1 to R7.

The oil passage structure 8 includes a first supply oil passage 8a, a second supply oil passage 8b, the two oil passages 80 described above (hereinafter also referred to as "paired oil passages 80"), a communicating oil passage 85, and the axial oil passage 86 described above. The communicating oil passage 85 communicates the paired oil passages 80 on the other axial side (Y2 side). The communicating oil passage 85 will be detailed in a second embodiment described later.

The first supply oil passage 8a communicates with the paired oil passages 80. The second supply oil passage 8b communicates with the axial oil passage 86. The first supply oil passage 8a and the second supply oil passage 8b are connected to each other and supplied with oil from an oil supply position P1. The oil may be supplied via an oil pump 89 and an oil cooler 88.

The oil supplied to the first supply oil passage 8a (see the arrow R2) branches into the paired oil passages 80 (see the arrows R3 and R4). The oil that has flowed into the paired oil passages 80 is discharged toward the coil end 322 through the oil holes 82 (see the arrows R5) and toward the coil end 321 through the oil holes 81 (see the arrows R6). The oil is discharged toward the stator core 31 through the oil holes 83 (see the arrows R7).

The oil supplied to the second supply oil passage 8b (see the arrow R1) is supplied to the axial oil passage 86 and used to cool the rotor core 40 and/or the permanent magnets as described above.

In the present embodiment, the paired oil passages 80 have the oil holes 81 for discharging oil toward the coil end 321 as described above. The paired oil passages 80 may have only the oil holes 82, or have, instead of the oil holes 81, the oil holes 83 for discharging oil toward the outer peripheral surface of the stator core 31 (portion on the Y2 side with respect to the coil end 321) as described above. In this case, the oil passage for cooling the coil end 321 may be formed on the second supply oil passage 8b side. The axial oil passage 86 may be connected to the first supply oil passage 8a together with the oil passages 80.

Next, effects of the present embodiment about the cooling of the stator 3 (the stator core 31 and the coils 32 in the slots 311) through the oil holes 83 described above (oil holes 83 for discharging oil toward the stator core 31) will be described with reference to FIGS. 7 and 8 in comparison with comparative examples.

Figure 7:
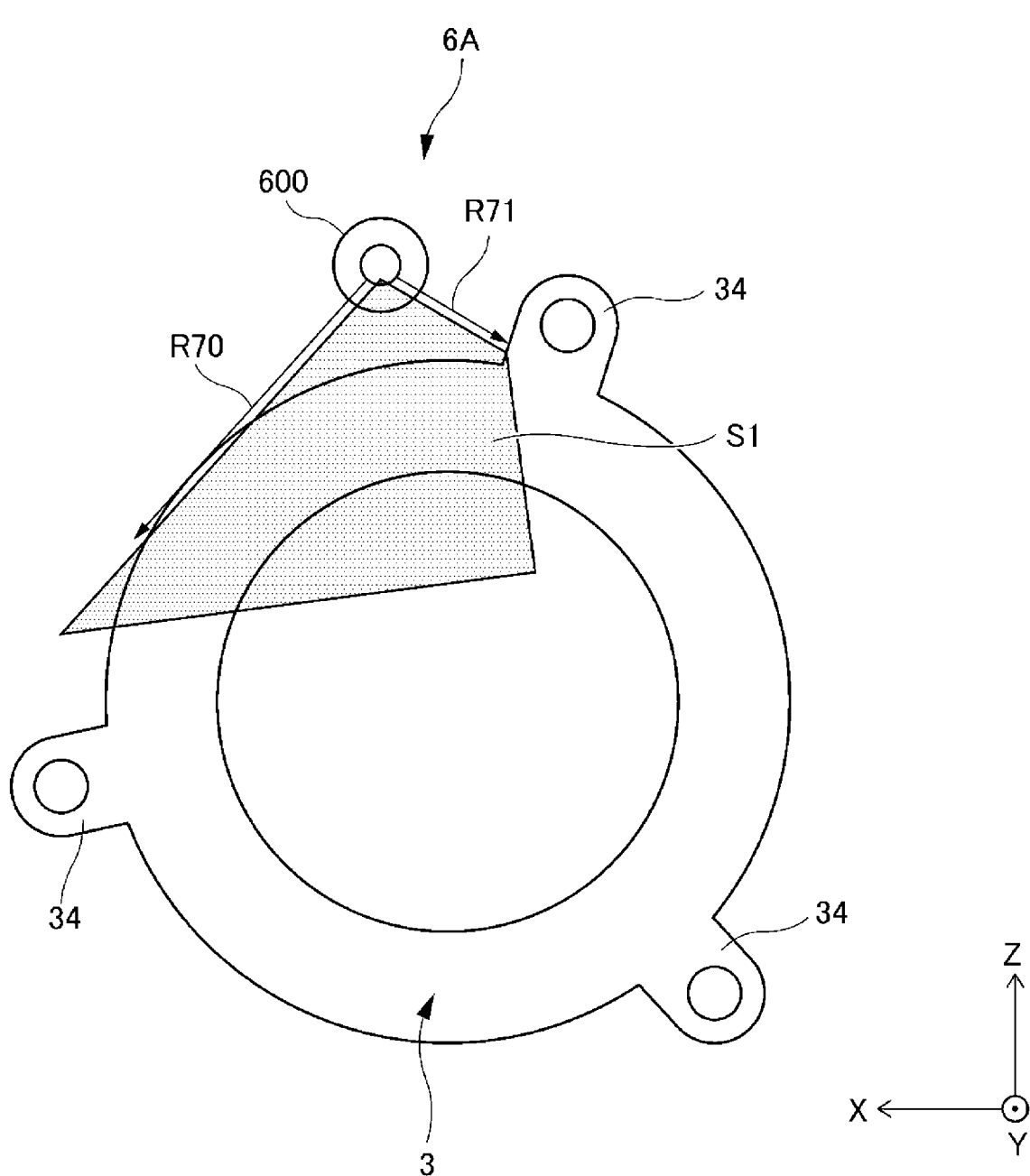
FIG. 7 is an explanatory diagram of an oil passage structure according to a first comparative example.

FIG. 7 is an explanatory diagram of an oil passage structure 6A according to a first comparative example, and schematically shows the oil passage structure 6A and the stator 3 when viewed in the axial direction. In FIG. 7, arrows R70 and R71 schematically indicate oil discharge directions, and a hatched area S1 schematically indicates a range covered by the discharged oil (coolable area).

The oil passage structure 6A according to the first comparative example has a configuration in which a cooling pipe 600 separate from the case extends in the Y direction.

In such a first comparative example, the number of components increases due to the use of the cooling pipe 600 separate from the case, and the cost increases. When the cooling pipe 600 is disposed at a radial position similar to that of the radial protrusion 34 as shown in FIG. 7, the oil distribution is likely to be hindered by the radial protrusion 34 (see the arrow R71 compared to the arrow R70). As a result, as indicated by the hatched area S1, the range covered by the oil discharged from the cooling pipe 600 to the stator core (coolable area in the stator core) is not uniform in the circumferential direction, and the cooling may be insufficient.

In the first comparative example, it is likely that the length of the cooling pipe 600 increases and a positioning pin needs to be set during assembling. When the positioning pin is set, the position of the positioning pin needs to be set in a direction that does not affect the distribution of the oil from the cooling pipe 600 apart from the mounting of the cooling pipe 600. As a result, reduction in the radial size of the entire rotary electric machine is likely to be hindered.

In the present embodiment, as described above, the oil passages 80 formed in, for example, the stator holding portions 22 of the case 2 are used instead of the cooling pipe 600 of the first comparative example. Therefore, it is possible to prevent the increase in the number of components due to the cooling pipe 600 and the increase in the cost along with it. Since the positioning pin is not required, it is possible to prevent inconvenience caused by the positioning pin (increase in the radial size of the entire rotary electric machine). In the present embodiment, as described above, the paired oil passages 80 are provided on both sides of the radial protrusion 34 in the circumferential direction. Accordingly, uniform cooling can be realized for the stator core 31 and the coils 32 in the slots 311 on both sides of the radial protrusion 34 in the circumferential direction based on the oil discharged from the oil holes 83 of the paired oil passages 80.

Figure 8:
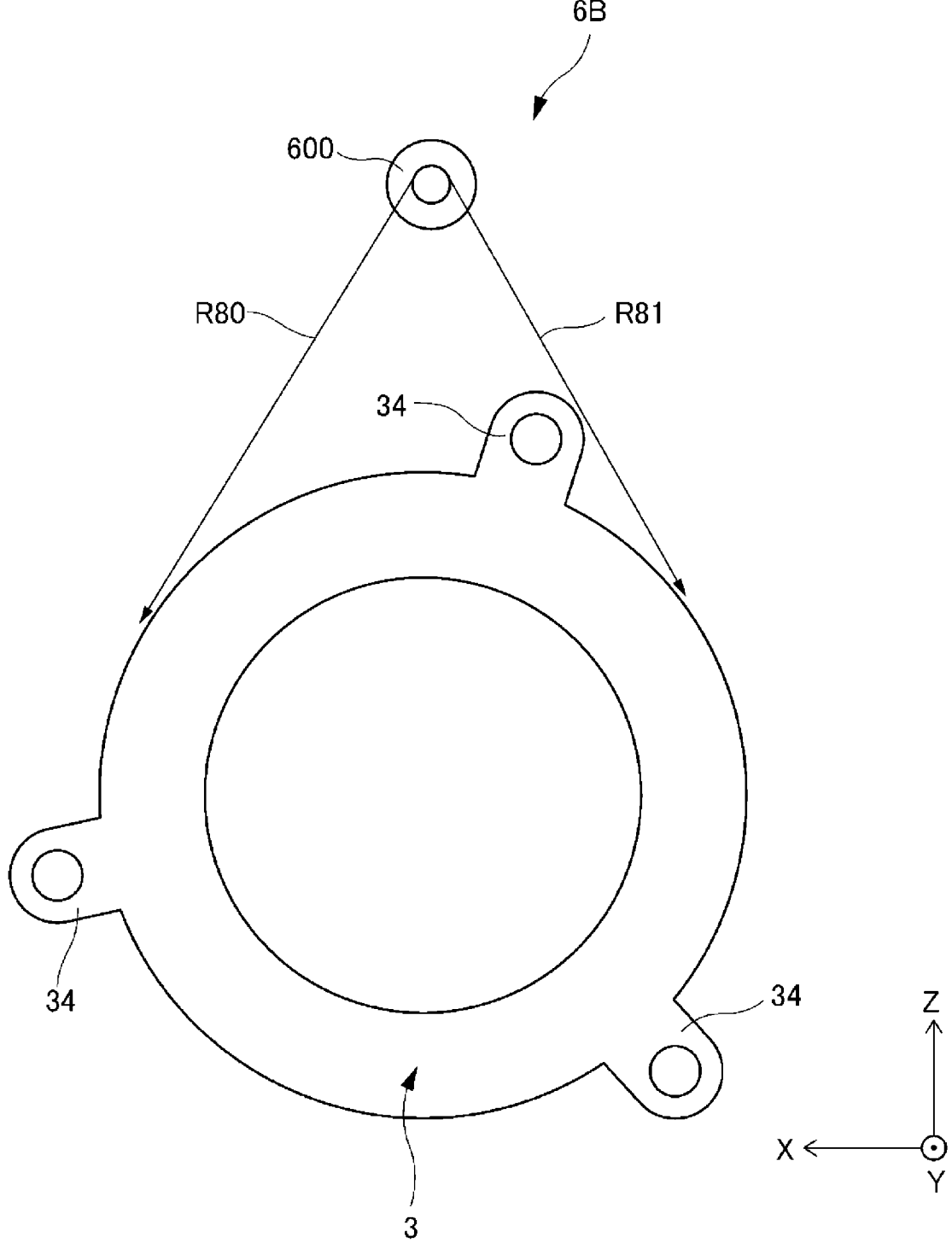
FIG. 8 is an explanatory diagram of an oil passage structure according to a second comparative example.

FIG. 8 is an explanatory diagram of an oil passage structure 6B according to a second comparative example, and schematically shows the oil passage structure 6B and the stator 3 when viewed in the axial direction.

The oil passage structure 6B according to the second comparative example has a configuration in which a cooling pipe 600 separate from the case extends in the Y direction. The second comparative example differs from the first comparative example described above in that the cooling pipe 600 is disposed at a radial position farther from the stator 3 than the radial protrusion 34. In this case, the radial protrusion 34 does not hinder the oil distribution (see an arrow R81 compared to an arrow R80). Therefore, it is possible to partially eliminate the inconvenience caused in the first comparative example.

In the second comparative example, however, the radial size of the entire rotary electric machine is likely to increase because the cooling pipe 600 is disposed at the radial position spaced away from the stator 3. That is, the radial size of the entire rotary electric machine is likely to increase by an amount corresponding to a space for mounting the cooling pipe 600.

In the present embodiment, as described above, the paired oil passages 80 are provided in the stator holding portions 22 and the tubular portions 24 located at the radial positions similar to that of the radial protrusion 34. Therefore, it is possible to prevent the increase in the radial size of the entire rotary electric machine 1 due to the paired oil passages 80. In this manner, according to the present embodiment, it is possible to establish the oil passages 80 that can realize uniform cooling in the circumferential direction while reducing the radial size and cost of the entire rotary electric machine 1 including the case 2.

Next, another embodiment (hereinafter also referred to as "second embodiment") different from the embodiment described above (hereinafter also referred to as "first embodiment" for distinction) will be described with reference to FIG. 9 and subsequent figures. In the following description and figures in the second embodiment, constituent elements that may be similar to those in the first embodiment described above may be represented by the same reference signs and description thereof may be omitted.

Figure 9:
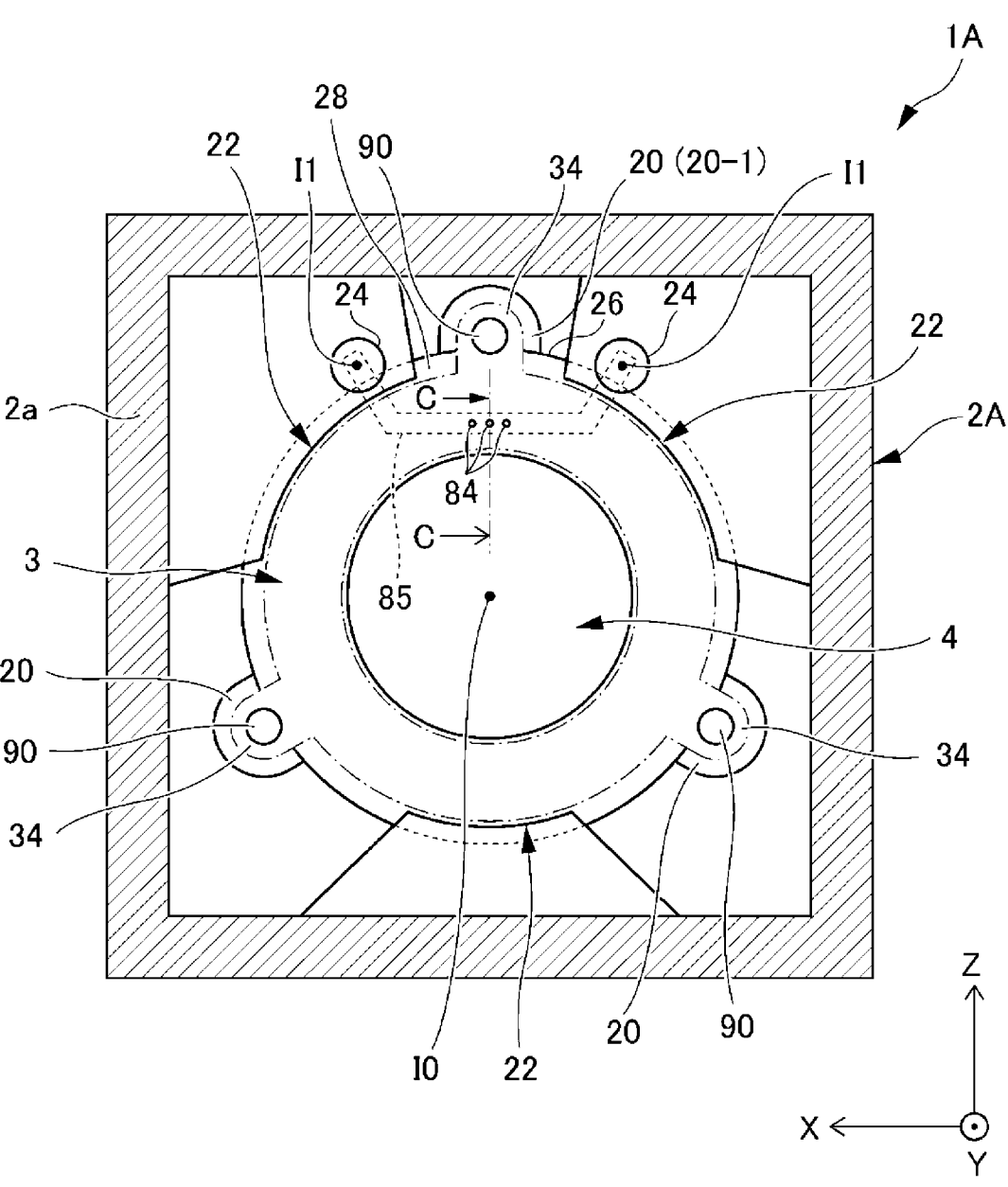
FIG. 9 is a plan view schematically showing a rotary electric machine according to a second embodiment.
Figure 10:
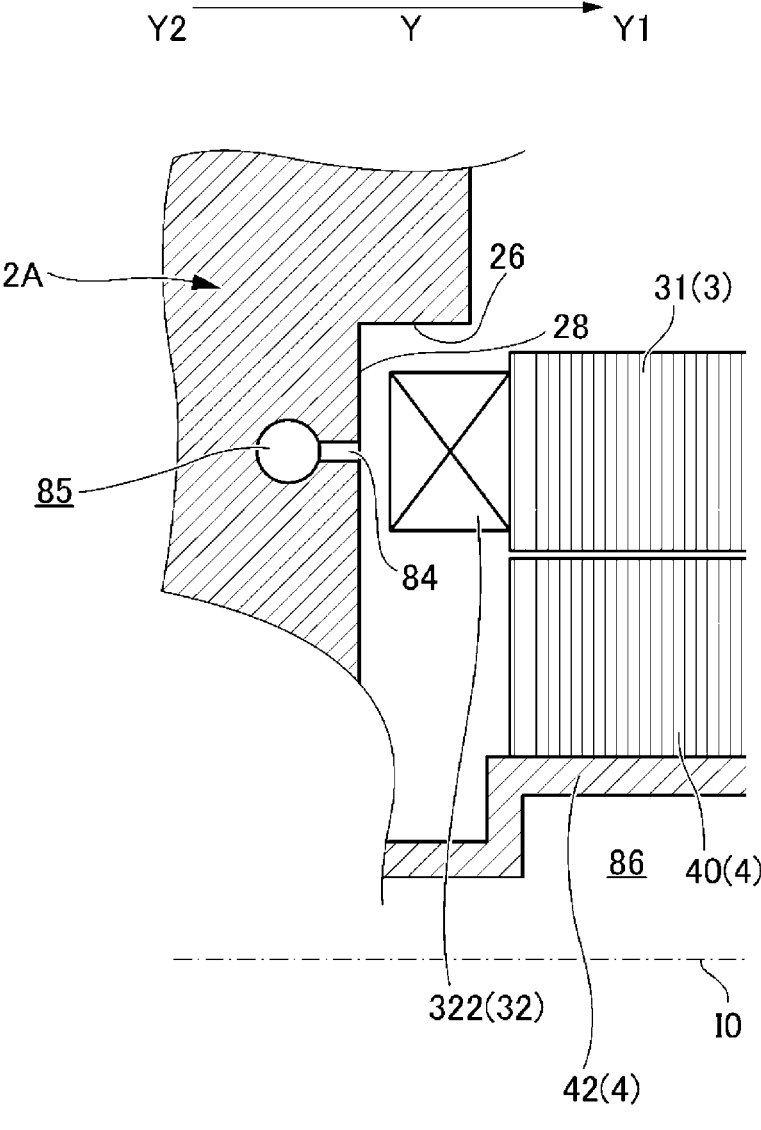
FIG. 10 is a schematic sectional view taken along a line C-C of FIG. 9.
Figure 11:
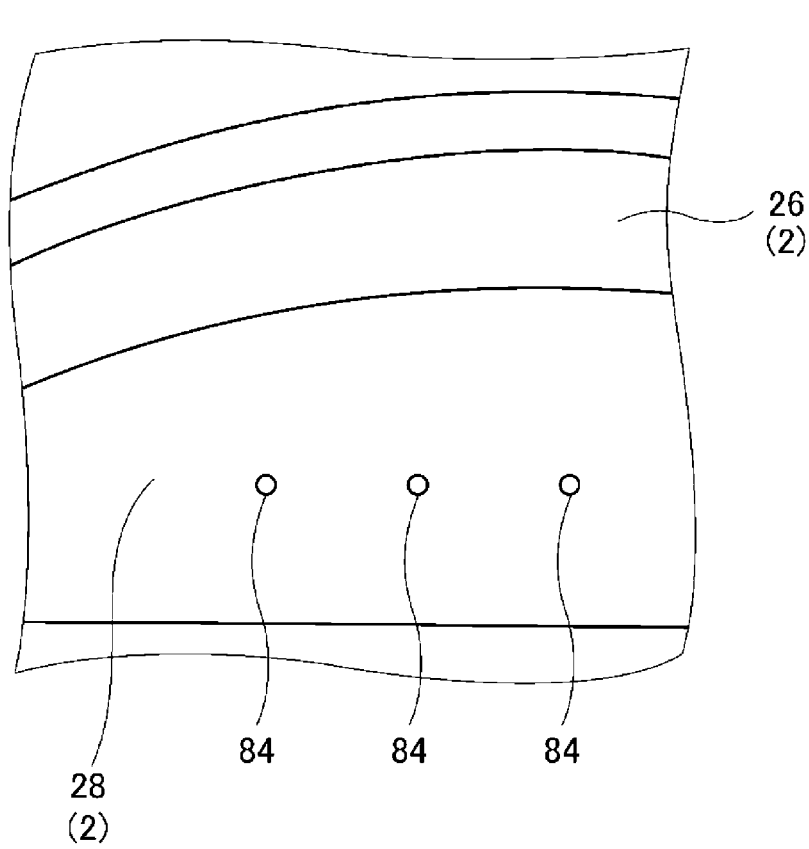
FIG. 11 is a perspective view schematically showing oil holes of a communicating oil passage.
Figure 12:
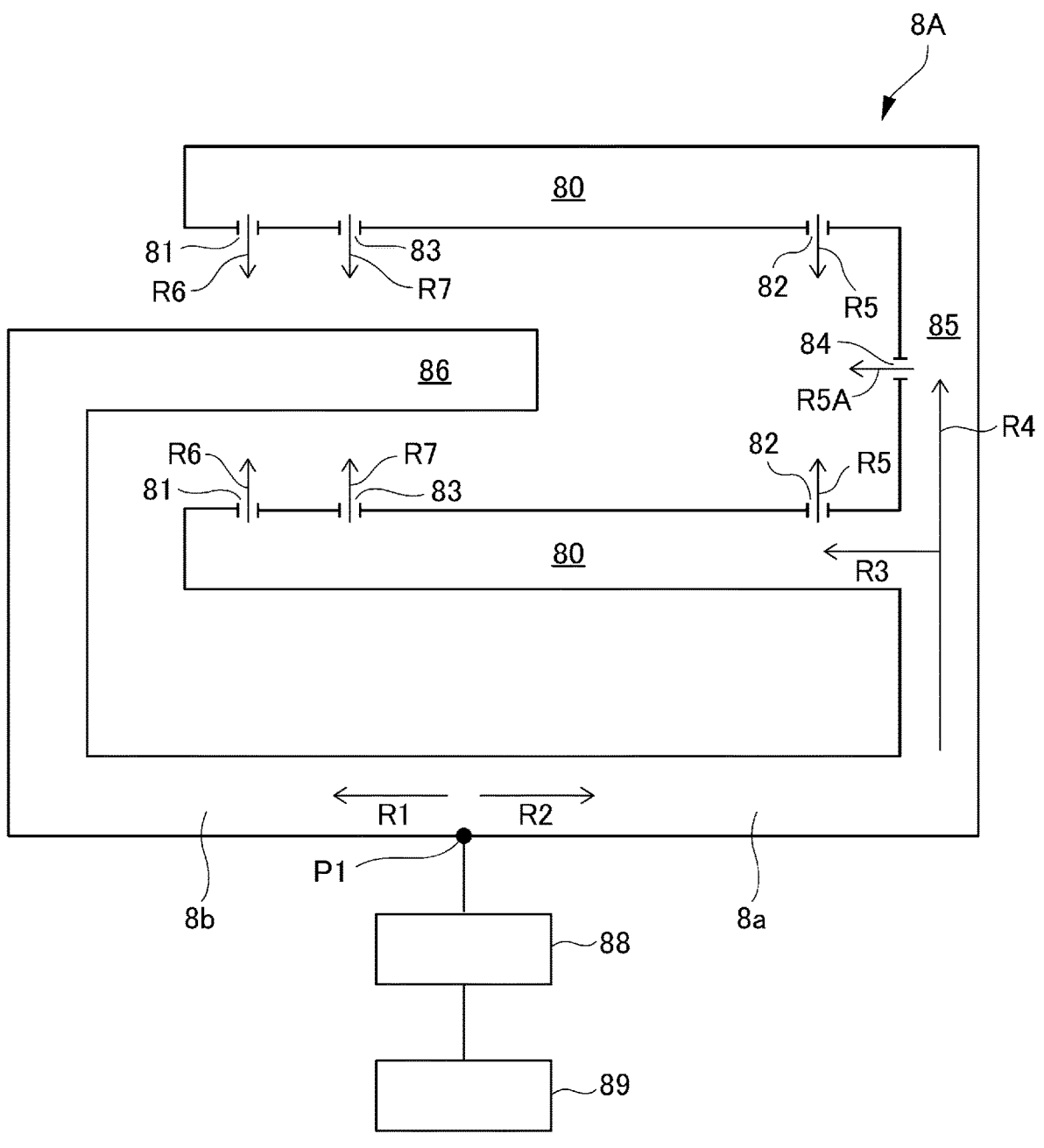
FIG. 12 is a diagram schematically showing an oil passage structure according to the second embodiment.

FIG. 9 is a plan view schematically showing a rotary electric machine according to the second embodiment. In FIG. 9, a part of the stator 3 is represented by a long dashed short dashed line for the purpose of description of the communicating oil passage 85 to be given later. FIG. 10 is a schematic sectional view taken along a line C-C of FIG. 9. FIG. 11 is an explanatory diagram of oil holes 84 of the communicating oil passage 85. FIG. 12 is a diagram schematically showing an oil passage structure 8A according to the second embodiment. A rotary electric machine 1A according to the second embodiment differs from the rotary electric machine 1 according to the first embodiment described above in terms of the configuration of the communicating oil passage 85 formed in a wall portion 28 of a case 2A.

The communicating oil passage 85 communicates the paired oil passages 80 on the other axial side (Y2 side). The communicating oil passage 85 may be formed in the wall portion 28. The wall portion 28 extends so as to intersect the axial direction and cover the stator 3 and the rotor 4 of the rotary electric machine 1 from the other axial side (Y2 side).

The wall portion 28 may form a support portion for a bearing (not shown) that rotatably supports the rotor 4 on the central axis I0 side. In the present embodiment, the wall portion 28 axially faces at least the stator 3. The wall portion 28 may axially face the stator 3 over the entire part of the stator 3 in the circumferential direction, or may axially face the stator 3 over a part of the stator 3 in the circumferential direction. In the present embodiment, the wall portion 28 axially faces the stator 3 and accordingly the coil end 322 in at least an upper section (section on the positive side in the Z direction) including a section between the paired oil passages 80 in the entire part of the stator 3 in the circumferential direction. An appropriate gap may be set between the wall portion 28 and the coil end 322 in the axial direction.

The communicating oil passage 85 has one end connected to one of the paired oil passages 80 and the other end connected to the other of the paired oil passages 80 on the other axial side (Y2 side). The communicating oil passage 85 may be connected directly to the other axial end of each oil passage 80 in the side wall portion 26.

The communicating oil passage 85 axially faces the stator 3 and accordingly the coil end 322. In the present embodiment, the communicating oil passage 85 axially faces the stator 3 and accordingly the coil end 322 in the upper section (section on the positive side in the Z direction) including the section between the paired oil passages 80 in the entire part of the stator 3 in the circumferential direction. In the example shown in FIG. 9, the communicating oil passage 85 extends linearly along the X direction in the section axially facing the coil end 322 as schematically shown, but may extend in any other way.

In the present embodiment, the communicating oil passage 85 has the oil hole 84 that can discharge oil toward the coil end 322. The oil hole 84 is formed in a section of the communicating oil passage 85 that axially faces the coil end 322. As shown in FIG. 10, the oil hole 84 may extend in the axial direction and may be open so as to axially face the axial end face of the coil end 322. The number of oil holes 84 is arbitrary. For example, as shown in FIGS. 9 and 11, three oil holes 84 may be formed away from each other in the circumferential direction.

Also in the oil passage structure 8A of the present embodiment, as shown in FIG. 12, the oil supplied to the first supply oil passage 8a (see the arrow R2) branches into the paired oil passages 80 (see the arrows R3 and R4). At this time, the oil that has flowed into the communicating oil passage 85 is discharged through the oil holes 84 toward the axial end face of the coil end 322 (see an arrow R5A). The oil that hits the axial end face of the coil end 322 can cool the coil end 322 at the portion that the oil hits. Also when the oil that hits the axial end face of the coil end 322 flows downward along the coil end 322, the oil can cool the coil end 322 at the portion where the oil flows. According to the present embodiment, the cooling of the coil end 322 can effectively be realized because the coil end 322 can be cooled by the oil in the axial direction. Since the Y2 side in the Y direction is higher in the cooling performance than the Y1 side in the Y direction by the oil discharged from the communicating oil passage 85 via the oil holes 84, the coil end 322 may be a lead-side coil end.

Also in the present embodiment, the same effects as those in the first embodiment described above can be obtained. According to the present embodiment, the cooling of the coil end 322 can effectively be realized because the communicating oil passage 85 has the oil holes 84 as described above.

While the embodiments are described in detail above, the present disclosure is not limited to specific embodiments, and various modifications and changes can be made within the scope of the claims. It is also possible to combine all or some of the constituent elements of the embodiments described above. Of the effects of each embodiment, those related to dependent claims are additional effects distinguished from generic concepts (independent claim).

For example, the paired tubular portions 24 are provided in the above embodiments, but either one or both of the paired tubular portions 24 may be omitted. In this case, extension of the stator holding portion 22 to the Y1 side may substitute for the tubular portion 24. However, such a modification is disadvantageous in that the material cost increases because of the widening of the set range of the stator holding portion 22 in the circumferential direction. If the axial extension range is the same, the material cost of the tubular portion 24 is lower than that of the stator holding portion 22. In other words, according to the above embodiments, it is possible to form the oil passage 80 that can cool the coil end 321 on the Y1 side while minimizing the set range of the stator holding portion 22 in the circumferential direction (thereby reducing the material cost).

In the above embodiments, each of the paired tubular portions 24 has both the oil hole 81 and the oil hole 83, but a part of the oil hole 81 and the oil hole 83 may be omitted.

The contents of the specifications of Japanese Patent Application No. 2020-200296 and Japanese Patent Application No. 2020-195272 are incorporated herein by reference as appropriate.

DESCRIPTION OF THE REFERENCE NUMERALS

1 . . . rotary electric machine, 3 . . . stator, 31 . . . stator core, 32 . . . coil, 321 . . . coil end (coil end on one axial side), 322 . . . coil end (coil end on other axial side), 34 . . . radial protrusion, 2 . . . case, 20 . . . fastening portion, 22 . . . stator holding portion, 221 . . . curved holding surface, 24 . . . tubular portion, 26 . . . side wall portion, 80 . . . oil passage (stator cooling oil passage), 81 . . . oil hole (first oil hole), 82 . . . oil hole (second oil hole), 83 . . . oil hole (first oil hole), 84 . . . oil hole (third oil hole), 85 . . . communicating oil passage (communicating passage), 10 . . . central axis

The invention claimed is:

1. A rotary electric machine comprising:
a stator including a stator core and a coil, and including a radial protrusion for fastening; and
a case that supports the stator core, wherein
the case includes:
a fastening portion to which the radial protrusion is fastened;
paired stator holding portions located on respective sides of the fastening portion when viewed in an axial direction, and forming respective curved holding surfaces extending in the axial direction and abutting against or facing an outer peripheral surface of the stator core in a radial direction;
an axial stator cooling oil passage formed in each of the paired stator holding portions, wherein the stator cooling oil passage has a first oil hole through which oil is dischargeable toward the stator core or a coil end on one axial side;
a communicating passage that communicates with the stator cooling oil passages on the other axial side, wherein the communicating passage has a third oil hole through which oil is dischargeable toward a coil end on the other axial side of the coil, the third oil hole facing the coil end on the other axial side of the coil in the axial direction; and
each stator holding portion of the paired stator holding portions has a single body that includes both the respective curved holding surface that has a substantially same curve as the outer peripheral surface of the stator core in order to match a curve of the outer peripheral surface of the stator core, and the axial stator cooling oil passage.

2. The rotary electric machine according to claim 1, wherein radially innermost portions of the stator cooling oil passages are closer to a central axis of the stator core in the radial direction than a radially outermost portion of the radial protrusion.

3. The rotary electric machine according to claim 1, wherein
the case includes a side wall portion adjoining each of the paired stator holding portions in the axial direction from the other axial side, and spaced farther away from a central axis of the stator core in the radial direction than the curved holding surfaces,
the stator cooling oil passage is also formed in the side wall portion continuously from the side wall portion to each of the paired stator holding portions, and
the side wall portion has a second oil hole through which oil in the stator cooling oil passage is dischargeable toward a coil end on the other axial side of the coil, the second oil hole facing the coil end on the other axial side of the coil in the radial direction.

4. The rotary electric machine according to claim 1, wherein
the case further includes paired tubular portions extending in the axial direction and adjoining the paired stator holding portions in the axial direction from the one axial side, and
the stator cooling oil passages are also formed in the paired tubular portions such that the stator cooling oil passages continue from the paired stator holding portions to the paired tubular portions, respectively.

5. The rotary electric machine according to claim 3, wherein
the case further includes paired tubular portions extending in the axial direction and adjoining the paired stator holding portions in the axial direction from the one axial side, and
the stator cooling oil passages are also formed in the paired tubular portions such that the stator cooling oil passages continue from the paired stator holding portions to the paired tubular portions, respectively.

\* \* \* \* \*